Dec. 13, 1927.

C. LE G. FORTESCUE 1,652,523

SUPER POWER SYSTEM

Filed Dec. 11, 1922

WITNESSES:

INVENTOR
Charles LeG. Fortescue
BY
ATTORNEY

Patented Dec. 13, 1927.

1,652,523

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

SUPERPOWER SYSTEM.

Application filed December 11, 1922. Serial No. 606,144.

My invention relates to systems for regulating the interchange of power between two constant-potential alternating-current lines, and it has particular application to super-power systems which are tied to smaller independent electrical systems in such manner that short-circuits on the smaller systems shall not damage the super-power line.

In the development of super-power systems, it is obvious that the super-power line must have a very high degree of reliability. It is also obvious that it will frequently be desirable to interchange power between the super-power line and smaller independent lines which are subject to relatively frequent interruptions.

In brief, the object of my invention is to provide a super-power line without circuit breakers and to interconnect such line for interchange of power with smaller electrical systems, by means of monocyclic squares or other static networks whereby the interchanged k. v. a. shall be constant, thereby limiting the maximum possible value of the energy interchanged.

Other objects of my invention, as well as the details thereof, will be apparent from the following description and claims when read in accordance with the accompanying drawings, wherein Figure 1 is a schematic diagram of a monocyclic square, with the directions of the current flow marked in order to explain the operation thereof.

Figures 1, 2, 3, 4:
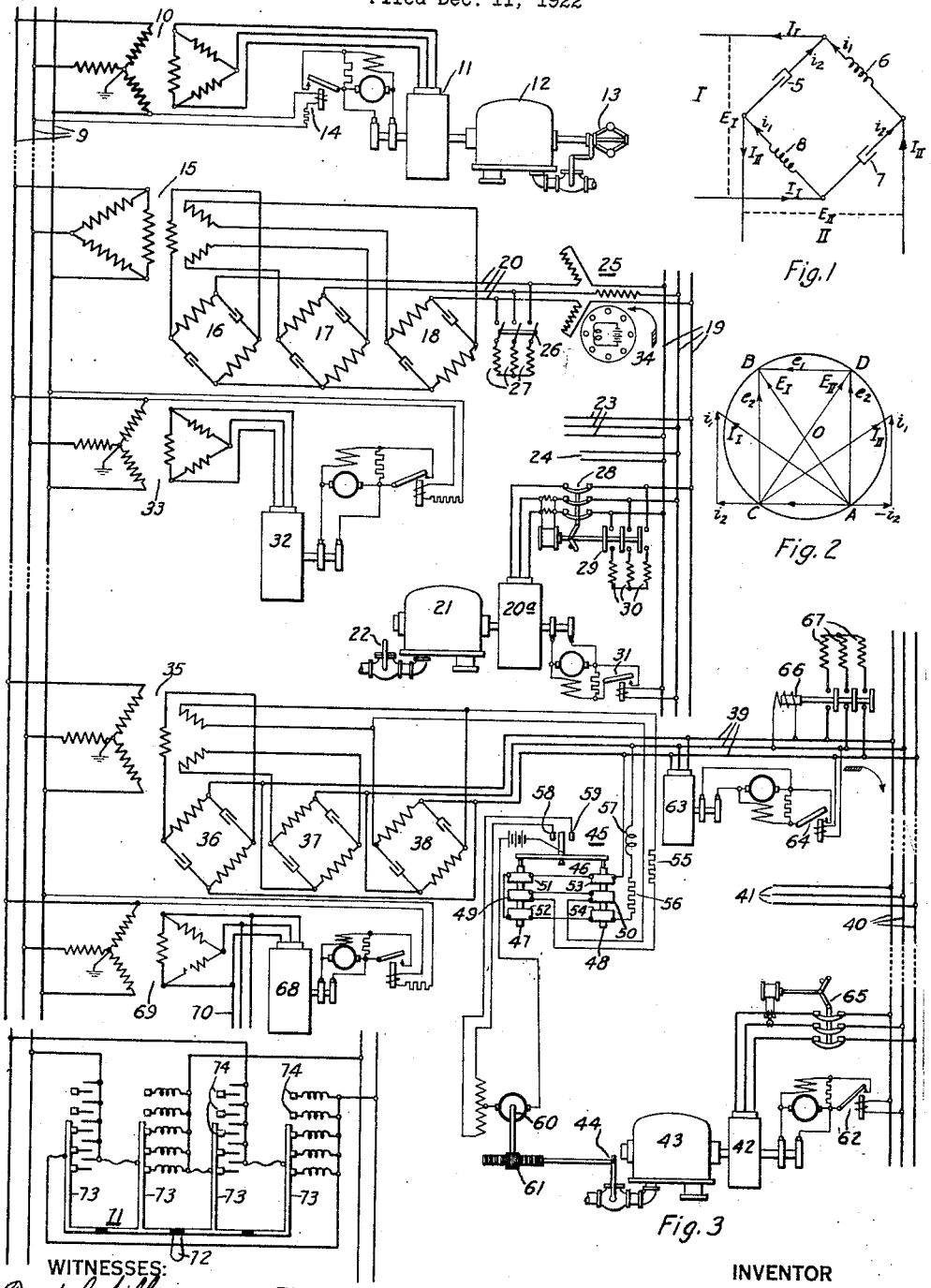
Fig. 2 is a vector diagram accompanying Fig. 1.
Fig. 3 is a schematic diagram of circuits and apparatus embodying my invention in an illustrative preferred form.
Fig. 4 is a detail view illustrating a possible adjustment of the monocyclic square.

In the illustrated embodiment of my invention, I have shown monocyclic squares, the characteristic features of which will be explained with reference to Figs. 1 and 2.

In Fig. 1, the monocyclic square is shown as comprising a static condenser 5, an inductor 6, a static condenser 7 and an inductor 8, connected in bridge formation with the primary circuit I connected across one diagonal, the elements 5, 8 and 6, 7, respectively, being in series. A secondary circuit II is connected across the other diagonal, with the elements 5, 6 and 8, 7, respectively, in series. The four elements 5, 6, 7 and 8, comprising the monocyclic square, all have equal admittances at the frequency for which the apparatus is designed.

Since the monocyclic square is symmetrical and has no power to produce a static difference of potential between the primary and secondary circuits, it is obvious that the primary and secondary voltages will also be symmetrical, bisecting each other at the point O, as indicated in Fig. 2, wherein the lines AB and CD represent the primary and secondary voltages $E_I$ and $E_{II}$, respectively. Owing to the symmetry, also, the currents in the inductors 6 and 8 are equal and are designated by the letter $i_1$ and the currents in the condensers 5 and 7 are also equal and are designated by the letter $i_2$, in Fig. 1.

It will be seen from Fig. 1 that the primary current $I_I$ divides, in the bridge, into the parts $i_1$ and $i_2$, whereas the secondary current $I_{II}$ divides, in the bridge, into the components $i_1$ and $-i_2$.

From an inspection of Fig. 2, it follows that if the voltages $E_I$ and $E_{II}$ are assumed to be equal, the voltage $E_I$, impressed upon the bridge, is made up of quadrature related components $e_1$ and $e_2$, representing the voltages impressed across the inductive and condensive reactors, respectively, of the bridge. The voltage supplied to the secondary circuit by the bridge is equal to the back electromotive forces of the inductive and condensive reactors which are equal and opposite to the components $e_1$ and $e_2$, respectively, but since $I_{II}=i_1-i_2$, we must put the secondary voltage $E_{II}=-e_1+e_2$, as indicated in Fig. 2.

The current $i_1$ in each of the inductive reactors of the bridge lags 90° behind the impressed voltage $e_1$ and is equal to $e_1$ times the admittance. In Fig. 2, the currents are plotted to such scale that they are equal in magnitude to the corresponding voltages. The current $i_2$, flowing in the two condensers of the bridge, leads the corresponding impressed electromotive forces $e_2$ by 90° and they are shown as being equal in magnitude to the voltage vector $e_2$ since the admittance of the condensers is the same as that of the inductors of the bridge. The primary and secondary currents $I_I$ and $I_{II}$ are, therefore, easily obtained from the formulas $I_I = i_1 + i_2$ and $I_{II} = i_1 - i_2$, as illustrated in Fig. 2.

It will thus be seen that if the secondary load draws lagging current, as illustrated, the current drawn from the primary circuit will be leading, and vice versa, the power factor being the same in the two circuits. It will also be observed that if the relative phases and the magnitudes of the primary and secondary voltages are fixed, both the primary currents and the secondary currents are absolutely fixed in phase and magnitude, each of the currents being in quadrature phase relation to the voltage in the other circuit and being equal in magnitude to the voltage of said other circuit times the admittance of one arm of the bridge. This is an important relation which is utilized throughout my invention. In the practical operation of my invention, however, the relative phases of the two voltages are not fixed, whereby the energy interchanged may adjust itself to the load requirements, as hereinafter explained.

In Fig. 3, I have illustrated my invention in a preferred form. A three-phase long-distance transmission line 9 of a super-power system is illustrated as being supplied with power, through a step-up transformer 10, from an alternator 11 which is driven by a suitable prime mover 12. The speed of the prime mover is automatically regulated by means of a speed governer 13 whereby the frequency of the super-power system is determined. The voltage of the generator is automatically controlled by a Tirrill regulator, or by any other suitable form of regulator, indicated schematically at 14.

The super-power line is tied to a number of independent smaller systems of distribution or power plants, through current-limiting networks, as described hereinabove. The maintenance of the smaller systems may be carried out in accordance with a number of different plans, two typical situations being depicted by way of illustration, in Fig. 3 of the accompanying drawing.

At some remote point in the long-distance line 9 is located a sub-station comprising a step-down transformer 15 in which the secondary phases are kept distinct and are connected to three monocyclic squares, or equivalent static networks 16, 17 and 18, respectively. Since the primary circuits of the networks are insulated one from another, the secondary circuits may be connected either in delta or in star, the star connection being illustrated in this case, and an independent three-phase system 19 is connected, by tie conductors 20, to the secondary diagonals of the monocyclic squares 16, 17 and 18.

The independent system 19 is shown as comprising a generator $20^a$, driven by a prime-mover 21. It is assumed, for this sub-station, that it is economical to operate the prime-mover 21 with a constant load at its maximum efficiency, the output of the prime mover being controllable by means of a throttle valve 22. While no speed regulator is shown on the prime mover 21, it will be understood that emergency speed-responsive protective devices would be employed in case the generator $20^a$ should fall out of step with the super-power system. In other words, the frequency is mainly controlled by the most sensitive governor 13.

The supply line 19 is shown as supplying a three-phase feeder 23 and one or more single-phase feeders 24, the excess energy of the independent line being supplied to the super-power system through the tie conductors 20 and the system of monocyclic bridges. In order to prevent the unbalancing of the superpower system, I have illustrated a series balancer 25, comprising a backwardly driven synchronous balancer machine, connected in series with the tie conductors 20, whereby only balanced currents are interchanged between the two systems.

Since the monocyclic square is a constant-current device, the secondary voltages of the monocyclic-square system 16, 17 and 18 would rise to prohibitively high values if the secondary circuits were open-circuited. I have, therefore, shown the switch 26, whereby the secondary circuits may be close-circuited through impedance devices 27. The impedances may be so chosen in value that the terminal voltages are normal when the full secondary current of the monocyclic-square network passes therethrough, but it is possible for the impedances of the devices 27 to be so small as to amount practically to a dead short-circuit on the secondary circuits of the monocyclic bridges, thereby causing no current-flow from the super-power line.

For a similar reason, the circuit breaker 28, which would be normally associated with the generator $20^a$, is provided with back contacts 29 for close-circuiting the line 19 through suitable impedance devices 30 when the main contacts of the circuit breaker are opened during abnormal current conditions. The voltage of the generator $20^a$ is normally controlled by any automatic voltage regulator 31, as is customary in the art.

The voltage of the super-power line on the primary side of the monocyclic networks 16, 17 and 18 is controlled by means of a suitably regulated synchronous condenser 32, which is connected to the super-power line through a step-down transformer 33. While separate transformers 15 and 33 are shown, in order to simplify the illustration, it is obvious that a single transformer having two insulated groups of low-voltage windings could be employed, if found more economical in practice. As a result of the arrangement, just described, the primary voltages of the monocyclic squares 16, 17 and 18 are definitely fixed and hence the secondary currents flowing in the tie lines 20 are always constant in value, tying the smaller distribution line 19 into synchronism with the main power line 9 in such phase relation as to effect the energy interchange necessitated by the load requirements in the two systems. Thus, while the value of the interchanged currents will remain constant, the power factor will vary as may be necessary to make the energy components suit the load requirements.

In operation, the generating station, represented by the turbine 21 and the alternator 20ª, associated with the smaller system 19, may be operated to supply power to the super-power system, as indicated by the arrow 34 between the tie line 20 and the distribution line 19. Under these circumstances, the generating station may be operated at a constant load, corresponding to its maximum efficiency, supplying its excess energy to the super-power system or deriving its excess load currents therefrom. However, the output of the prime mover 21 may be varied in accordance with the dictates of a load dispatcher for the super-power system, whereby the required energy of the super-power system may be derived in the most advantageous manner, from the most economical generating plants associated therewith, or in accordance with the contracts entered into by the respective companies.

At another remote point in the super-power line is located another sub-station which is tied to the super-power line through a step-down transformer 35 and three monocyclic bridges 36, 37 and 38. The secondary circuits of the bridges are connected in delta to a tie line 39 supplying an independent transmission system 40. The transmission system 40 is illustrated as a long line having a polyphase feeder 41 at a point remote from the tie line 39, and having a generator 42 at a second remote point, the latter being driven by a steam turbine 43, the output of which is controlled by a throttle valve 44.

In the case of the independent transmission system 40, it is assumed that the generating station is rather uneconomical in operation, so that a substantially constant amount of power is purchased from the super-power system more cheaply than it can be generated by the steam turbine plant. Hence, the throttle valve of the turbine will be regulated, either by hand or automatically, to take care of the peak-load requirements of the system, so as to draw, at all times, nearly the maximum energy permitted by the monocyclic-bridge network from the super-power system. The maximum permissible energy corresponding to exactly unity-power-factor current in the tie line, is not drawn from the super-power system, since any sudden increase in the load demands on the system 40 would tend to cause the system 40 to pull away from the super-power system and the two systems would then operate out of step.

The automatic control of the throttle valve 42 may be effected either by means of a wattmeter or by means of a power-factor indicator or phase indicator. By way of illustration, I have shown a phase indicator 45, comprising a rocking arm 46 having its ends attached to armature cores 47 and 48 of composite electromagnets made up of centrally disposed coils 49 and 50, respectively, and end coils 51, 52, and 53, 54, respectively.

The centrally disposed coils 49 and 50 are connected, in series, through a regulating resistor 55, across the primary side of one of the monocyclic squares, as 38. The end coils 53, 51, 52 and 54 are connected, through the regulating resistor 56 and a small choke-coil 57, across the secondary circuit of the same monocyclic square. By reason of the choke coil 57, the currents in the coils 51 to 54 are caused to lag somewhat behind the secondary voltage $E_{II}$ of Fig. 2, whereas the currents in the centrally disposed coils 49 and 50 are in phase with the primary voltage $E_I$ of Fig. 2.

The regulator 45 operates to maintain these two currents in quadrature phase relation such that the mains 40 always draw leading wattless-component currents from the monocyclic-square networks, causing the latter always to draw lagging wattless-component currents from the super-power line, for reasons which will be explained hereinafter. Any departure from the predetermined phase relation between the primary and secondary voltages of the network 38 will cause the one or the other of two contacts 58 and 59 to be energized to operate a small regulating motor 60 which is connected to the throttle valve 44 through any suitable mechanism such as a rack and pinion connection 61.

The voltage at the terminal of the generator 42 is controlled by any suitable regulator 62, as is customary, and the voltage on the tie line 39 is controlled by means of a synchronous condenser 63 which is permanently connected to said tie line, the voltage of the condenser being controlled by any suitable voltage regulator 64.

The primary circuits of the generator 42 are shown as being provided with an ordinary circuit breaker 65 while the tie lines 39 are protected by an over-voltage relay 66, operating to close-circuit the tie line, through suitable impedance devices 67, upon the occurrence of excess voltage conditions.

The voltage of the super-power line on the primary side of the monocyclic-square network is controlled, as before, by means of a suitably regulated synchronous condenser 68 connected thereto through a step-down transformer 69.

In super-power systems having high voltages, the leading charging currents of the line are quite large, usually necessitating that any synchronous apparatus connected across the line shall be under-excited, or even reversely excited, in order to hold down the voltages. Under such conditions, the synchronizing powers of the synchronous machines are a minimum. According to my system, the small-power line 40, when drawing light loads from the super-power line 9, will draw very large lagging wattless currents from the super-power line, thus neutralizing the leading line-charging currents and causing the synchronous condenser 68 to be over-excited, thereby increasing its power to keep in synchronism without the possibility of hunting.

When full load is drawn by the small-power line 40, the currents will have nearly unity power-factor and the synchronous condenser 68 will operate at substantially the same excitation as if the tie line 39 were not present.

If desired, part of the load taken from the super-power line may be delivered, through monocyclic bridges, to a supply line, such as 40, which is subject to frequent interruptions, whereas another part of the load may be delivered to another supply line 70, which may be connected to the transformer 69, the line 70 being sufficiently free from shut-downs to warrant such direct connection, the ordinary protective devices not being shown. Since most loads, represented by the line 70 will draw lagging currents, the loads delivered to the two lines 40 and 70 may be so proportioned that the minimum excitation requirements of the condenser 68 may be improved.

While I have illustrated my invention in accordance with certain specific embodiments, it will be obvious that the essential features of my invention are very generic in their application and can be employed according to numerous different methods of operation and load dispatching.

In both of the sub-stations shown, I have indicated the monocyclic squares as having fixed admittances in the respective arms thereof. It will be obvious, however, that the admittances can be changed in accordance with the different requirements of day loads or night loads, or according to the season of the year, and for this purpose it will be convenient to arrange a switch, as illustrated in connection with a single-phase system, in Fig. 4, wherein a condensive element or a reactive element, as the case may be, is simultaneously added to, or taken away from, each of the arms of the bridge by means of a switch device 71, having a handle member 72 and having four contact arms or rings 73 bearing upon brushes 74 connected to the several reactor elements. It will be understood that in a three-phase system all of the bridges will be adjusted simultaneously.

In the foregoing specification and appended claims, I employ the expression, "constant-voltage system", or the like, to designate any parallel system of electrical distribution or transmission, regardless of the degree of constancy of the voltage, as distinguished from a series system wherein the current is maintained substantially constant at the expense of the voltage.

I claim as my invention:

1. The combination with two constant-voltage alternating-current systems, of inherently operating means for interchanging currents with either system in proportion to the voltage on the other system.

2. The combination with two constant-voltage alternating-current systems, of one or more static networks interconnecting the two systems and inherently operating to cause the current interchanged with either system to be proportional to the voltage on the other system.

3. The combination with two constant-voltage alternating-current systems, of a monocyclic square interposed between the two systems.

4. The combination with a constant-voltage alternating-current system having greater energy and high reliability, of an independent constant-voltage alternating-current system of the same frequency but having less energy and less freedom from faults, and one or more static networks interconnecting the two systems and inherently operating to cause the current interchanged with either system to be proportional to the voltage on the other system.

5. The combination with a constant-voltage alternating-current system having relatively great energy and high reliability, of an independent constant-voltage alternating-current system of the same frequency but having less energy and less freedom from faults, and a monocyclic square interposed between the two systems.

6. The combination with an alternating-current system having greater energy and high reliability, of an independent alternating-current system of the same frequency but having less energy and less freedom from faults, and one or more static networks interconnecting the two systems and inherently operating to cause the current interchanged with either system to be proportional to the voltage on the other system, the smaller system comprising means for controlling the voltage thereof, thereby limiting the current drawn from the larger system during abnormal conditions on the smaller system.

7. The combination with an alternating-current system having relatively great energy and high reliability, of an independent alternating-current system of the same frequency, but having less energy and less freedom from faults, and one or more monocyclic squares comprising tuned inductors and static condensers interposed between the two systems, the smaller system having a synchronous dynamo-electric machine connected thereacross, and electro-responsive means for automatically controlling the terminal voltage of said machine.

8. The combination with two constant-voltage alternating-current lines, of a prime-mover and a generator in each of said lines, one or more static networks interconnecting the two lines and inherently operating to cause the current interchanged with either line to be proportional to the voltage on the other line, frequency-controlling means associated with only one of said lines, and means for varying the power output of the prime mover in the other of said lines.

9. The combination with two constant-voltage alternating-current systems, of one or more static networks interconnecting the two systems and inherently operating to cause the current interchanged with either system to be proportional to the voltage on the other system, said systems comprising means for normally maintaining substantially constant voltages in both systems at the terminals of said static network, thereby fixing the maximum possible amount of energy which may be interchanged between the systems, only one of said systems having frequency-controlling means associated therewith, and the other of said systems having electro-responsive means for automatically controlling the output of its prime-mover when the energy-interchange attains a predetermined proportion of its maximum value, whereby the interchanged energy requirements are maintained below said maximum.

10. The combination with two constant-voltage alternating-current systems, of one or more static networks interconnecting the two systems and inherently operating to cause the current interchanged with either system to be proportional to the voltage on the other system, and means for causing said networks always to draw lagging wattless currents from, or to supply leading wattless currents to, the system having the higher voltage.

11. The combination with two constant-voltage alternating-current transmission lines, of interconnecting means therebetween normally operating to maintain constant current while the two transmission-line voltages are being maintained constant, the phase relation between the voltages of the two lines being variable to meet changing load and power requirements.

In testimony whereof, I have hereunto subscribed my name this 6th day of December, 1922.

CHARLES LE G. FORTESCUE.